United States Patent [19]

Evrard

[11] 4,033,533

[45] July 5, 1977

[54] VIBRATION ABSORBER

[75] Inventor: Gérard Maurice Gaspard Evrard, Livry Gargan, France

[73] Assignee: Societe Nationale d'Etude et de Construction de Moteurs d'Aviation, Paris, France

[22] Filed: Jan. 9, 1976

[21] Appl. No.: 647,792

[52] U.S. Cl. .................... 248/358 R; 248/22; 267/67

[51] Int. Cl.² ........................ B60G 11/18

[58] Field of Search ......... 248/358 R, 22, 24, 15; 403/221, 222, 225; 267/67, 153

[56] References Cited

UNITED STATES PATENTS

| | | | |
|---|---|---|---|
| 2,375,105 | 5/1945 | Hile | 248/358 R |
| 2,386,463 | 10/1945 | Hile | 248/358 R |
| 2,393,071 | 1/1946 | Schaelchlin | 248/358 A |
| 3,096,106 | 7/1963 | Wanner | 403/197 |
| 3,193,237 | 7/1965 | Adams | 248/358 R |
| 3,203,654 | 8/1965 | Sweeney et al. | 248/358 R X |
| 3,219,305 | 11/1965 | Chartet | 248/358 R |
| 3,532,319 | 10/1970 | Brown | 248/358 R |
| 3,756,551 | 9/1973 | Bishop | 248/358 R |

FOREIGN PATENTS OR APPLICATIONS 872,770   7/1961   United Kingdom ........... 248/358 R Primary Examiner—J. Franklin Foss
Attorney, Agent, or Firm—Watson, Cole, Grindle & Watson

[57] ABSTRACT

A vibration absorber for assembling a vibrating element and a non-vibrating element has an intermediate plate fixed between two parts of an elastomeric material placed between two plates linked by a tubular cross-piece. The absorber is made in two halves each formed from a rigid tubular fastening provided with an end flange and a ring in elastomeric material surrounding the fastening and having a plurality of projections or ribs on its surface removed from the flange. A brace acts on the fastenings across their tubular parts in order to cause the projections or ribs to engage with both sides of the intermediate plate.

4 Claims, 9 Drawing Figures

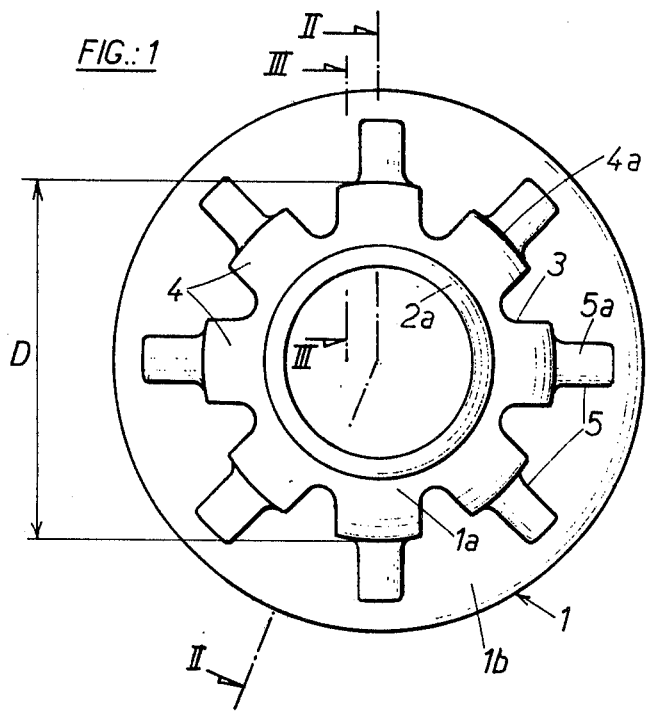
FIG.: 1
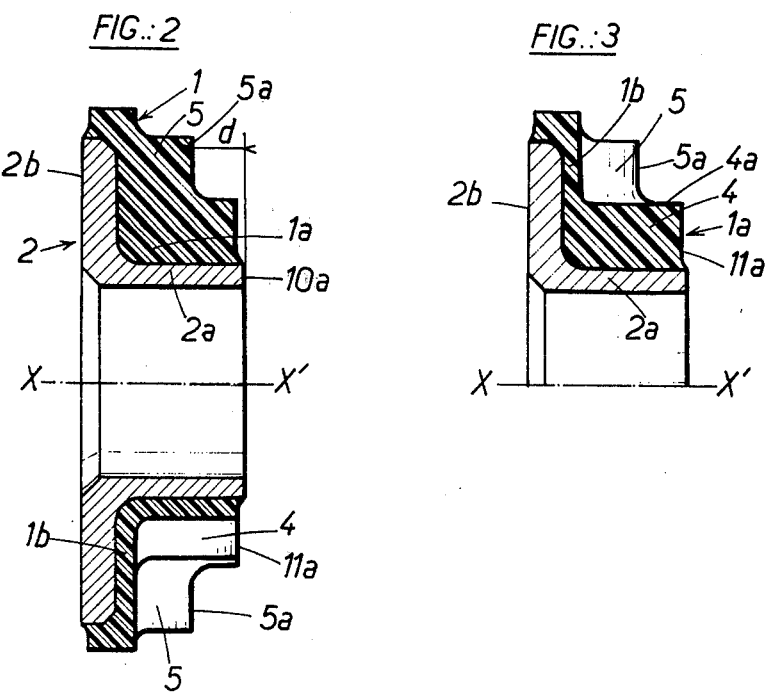
FIG.: 2
FIG.: 3

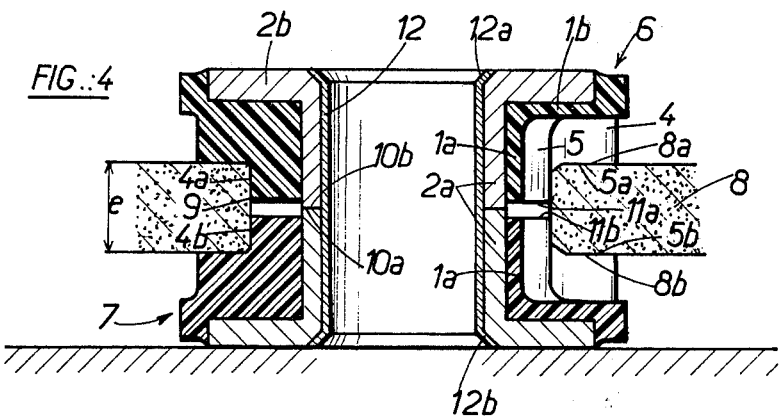
FIG.:4
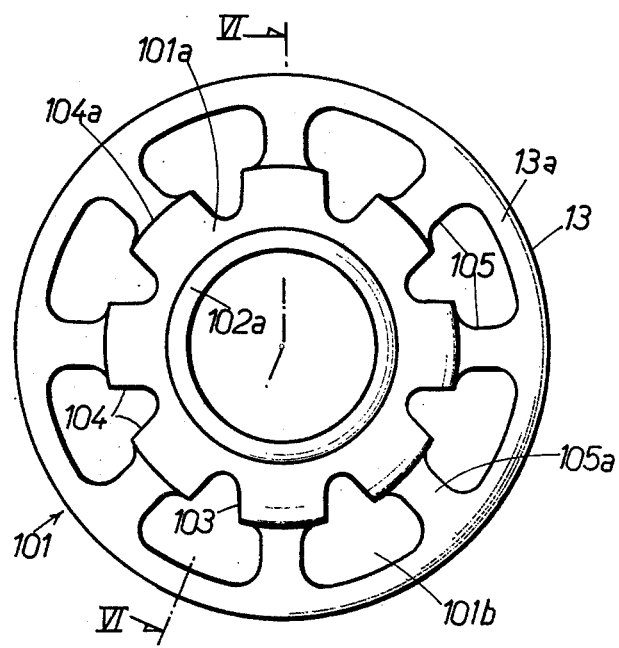
FIG.:5
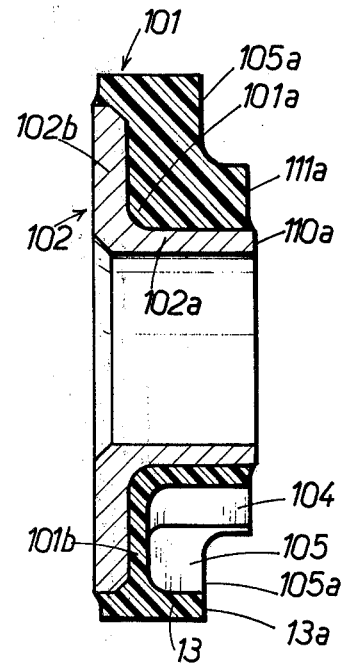
FIG.:6

U.S. Patent   July 5, 1977   Sheet 3 of 3   4,033,533
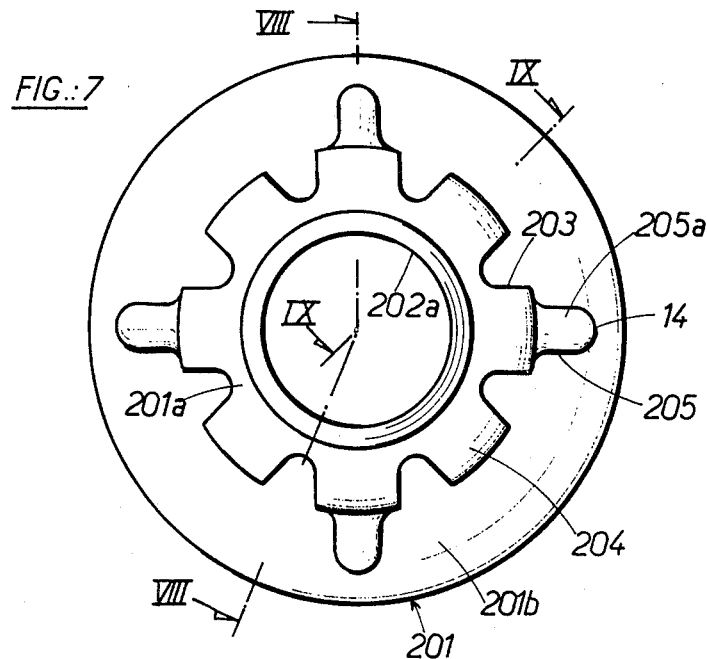
FIG.:7
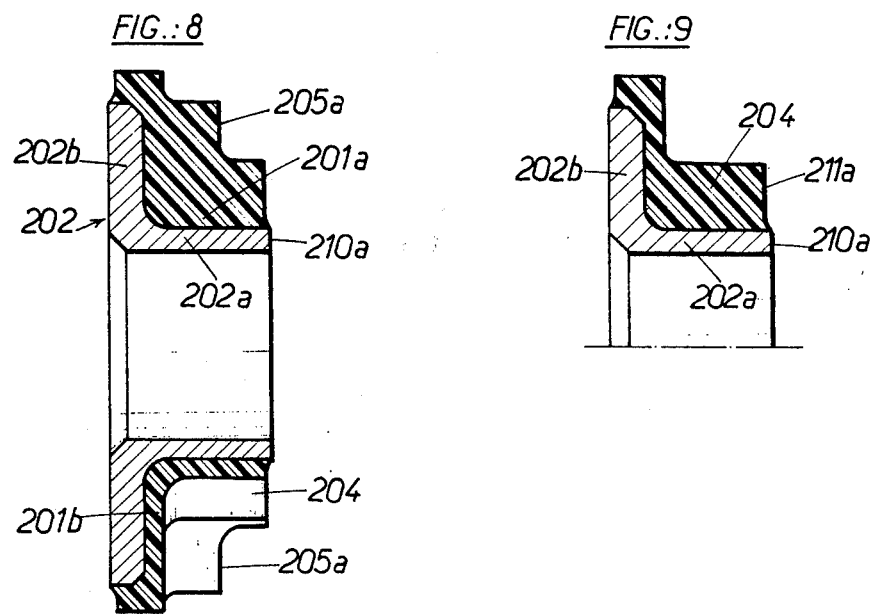
FIG.:8
FIG.:9

VIBRATION ABSORBER

This invention relates to vibration absorbers for connecting a vibrating element to a non-vibrating element, for example for connecting a support which is likely to vibrate to a part to be protected from the vibrations. The invention is particularly applicable to fixing small parts, such as control accessories or electronic components in an aeroplane.

A known vibration absorber is composed of a block of rubber or other elastomeric material set between two small plates connected by a tubular cross-piece crossing the block, and of an intermediate plate with the inside edge inserted in the block between the two small plates. Such an absorber can be fixed to one of the elements, for example to the vibrating support, by a pin or a gudgeon crossing the tubular cross-piece, the other element being fixed to the intermediate plate.

Relative displacement of the two elements causes deformations of the block which in turn give rise to internal friction within the mass of the block. This friction absorbs the vibrations. These deformations cause alternating variations in the compression of the elastomeric material on both sides of the intermediate plate and, when the deformations reach a certain size, the resulting variations in compression in certain parts of the block are often accompanied by traction and/or shearing stresses in other parts. Elastomeric materials, for example rubber, which work very well under compression, have only moderate resistance to traction and shearing. In order to avoid being liable to damage, it is necessary for the block of elastomeric material to have dimensions considerably larger than those which would be sufficient if it were working only under compression. On the other hand, in order to obtain the required absorption properties it is necessary precisely to control the amount by which the block of elastomeric material is prestressed at the time of installing the absorber so that is is zero or very low. In practice, installation can only be carried out by specialised personnel and in a specially equipped place.

This invention has as its object the provision of very small absorbers, usable for example for fixing regulating accessories or electronic components on an aeroplane, which can be mounted in situ, directly on the elements to be assembled.

According to the invention there is provided a vibration absorber for connecting a vibrating element to a non-vibrating element, comprising two halves each formed from a rigid fastening having a tubular part and an end flange, and from a ring of elastomeric material surrounding the rigid fastening, and having a plurality of projections on the surface remote from the flange, an intermediate plate traversed by an opening and a brace acting on the fastenings across the tubular parts of the two halves, for causing the said projections of the rings of elastomeric material to engage with both sides of the intermediate plate around the said opening.

As the two elastomeric rings are linked to the plate only by forces of compression and are able to be deformed independently of each other, substantial relative displacements of this plate causing removal of a part thereof from engagement with the flange of one of the halves of the absorber, allow the corresponding part of the elastomeric ring of this half of the absorber to slacken and return to the free state, but do not exercise any traction or shearing force on it. In addition, the amount of pre-stress of the elastomeric rings is controlled automatically during assembly of the absorber by the fact that the holding force exercised on them by the brace is limited by the rigid fastenings the tubular portions of which abut against each other. It is therefore unnecessary to make the absorbers over-size, and their mounting does not require special precautions.

If the two halves of the absorber are provided for enclosing a part of one of the elements to be assembled in the form of a plate, for example a part of the element which must be protected from vibrations, mounting of the absorber will be carried out on this element. The brace can be for example a pin for fixing the absorber to the other element; mounting will then be carried out at the same time as the assembling of the two elements. However, the brace will generally be a section of tube engaged in the two tubular fastenings and supported, for example by riveting, at their outer ends which form the flanges. The absorber can thus be fixed to the second element by means of a gudgeon or a pin inserted into the tubular brace.

At least one of the elastomeric rings advantageoulsy comprises a hub and an extended part in the form of a flange which adhere respectively to the tubular part and to the end flange of the rigid fastening. The inside surface of the elastomeric flange and the peripheral surface of the hub are preferably notched, so as to form between the notches a plurality of projections and/or ribs by which they are supported respectively against one of the surfaces of the intermediate plate and against the edge of the opening therein.

Embodiments of the invention, given as nonrestrictive examples, will now be described with reference to the accompanying drawings, in which:-

FIG. 1 is a plan view of a half a vibration absorber according to the invention, FIG. 2 is a cross-sectional view taken on the line II—II of FIG. 1, FIG. 3 is a semi-cross-sectional view taken on the line III—III of FIG. 1, FIG. 4 is a cross-sectional view similar to FIG. 2, but on a smaller scale, showing a vibration absorber made of two halves identical to that of FIGS. 1 to 3, FIGS. 5 and 6 are views similar to FIGS. 1 and 2 respectively, showing a modification, FIG. 6 being a cross-sectional view taken on the chain dotted line VI—VI of FIG. 5, and FIGS. 7 to 9 are views similar to FIGS. 1 to 3 respectively, showing another variation, FIGS. 8 and 9 being a cross-sectional view taken on the cross-sectional line VIII—VIII and a semi-cross-sectional view taken on the line IX—IX of FIG. 7 respectively.

FIGS. 1 and 2 shown half of an absorber comprising a ring 1 of synthetic elastomeric material, formed around a metallic fastening 2 comprising a tubular part 2a with a flange 2b at one end. The elastomeric ring 1 has a generally L-shaped section, the two branches of which adhere respectively to the tubular part 2a and the flange 2b of the metallic fastening 2. The branch which adheres to the tubular part forms a "serrated" hub 1a defined by a cylindrical mass which is notched by several grooves 3 (eight grooves in the embodiment shown) parallel to the axis XX' of the fastening 2 and regularly distrubuted around this axis, between which there are as many radially directed serrations 4, similar to the teeth of a cylindrical gear. The other branch adheres to the metallic flange 2b and comprises and elastomeric flange 1b on which are formed as many radial projections 5, as there are grooves 3. Each projection is aligned with one of the serrations 4 and extends over a part of the length thereof to a distance $d$ from the end of the tubular fastening opposite the flange 2b, the extreme edges of all the projections 5 forming level surfaces 5a situated in a plane perpendicular to the axis XX'.

This half of the absorber, designated by the reference 6 in FIG. 4, is intended to cooperate with another identical half 7 to form an absorber for attachment of a vibrating support (not shown) to a part to be protected from vibrations, one portion of which, in the form of a plate, is shown at 8. The two surfaces 8a, 8b of this plate 8 are machined in such a way that their thickness $e$ is equal to $2 \times d$ with production tolerances ensuring that it is not below this amount. The plate 8 is pierced by a circular opening 9 which extends perpendicular to the surfaces 8a and 8b, and has diameter equal to the diameter D of the serrated hub 1a with production tolerances ensuring that it is not more than this latter diameter. The serrated hubs 1a of the two halves of the absorber 6 and 7 inserted face to face in the opening 9, from both sides of the plate 8, until the two inside ends 10a, 10b of the tubular parts 2a of the fastenings, which, as seen on the drawings, project slightly beyond the respective inside ends 11a and 11b of the hubs, abut against each other. The two halves 6 and 7 of the absorber are then fixed in this position by means of a piece of metallic tube 12 with an external diameter equal to or very slightly less than the inner diameter of the tubular fastenings 2. The outer ends 12a and 12b of the piece of tube 12 are rivetted to the tubular fastenings 2.

The thus formed absorber is integral with the part to be protected from vibrations, and this can be fixed to the vibrating support (not shown) by mounting the piece of tube 12 on a gudgeon (not shown) of this support and by fastening it there by means of a threaded nut (not shown). The slate shaped portion 8 of the part to be protected, is supported without play (and may even be an interference fit, account being taken of the production tolerances as indicated above) by the elastomeric rings 1 of the two halves of the absorber, the surfaces 8a and 8b of this plate 8 being in contact respectively with the terminal surfaces 5a and 5b of the projections 5 of the two elastomeric flanges, and the bore of the opening 9 being in contact with the parts 4a and 4b (which are situated between these terminal surfaces 5a and 5b) of the two elastomeric serrated hubs. The part to be protected is therefore supported only by a certain number of projections (serrations 4 and projections 5) of the elastomeric rings. Consequently it is supported with a much greater flexibility, in the radial direction as well as in the axial direction than if it were supported by solid elastomeric rings. It should be noted that it would be practically impossible to provide these projections in a traditional absorber comprising a block of elastomeric material in one piece.

As was explained in the introduction to this specification, the elastomeric material works only under compression and installation of the two halves of the absorber affects only the metallic parts, i.e. the inside ends 10a and 10b of the fastenings so that the elastomeric material does not run the risk of being prestressed beyond the slight compression possibly resulting from the manufacturing tolerances, thus avoiding the risk of increasing its resonance frequency. It is moreover possible to use the halves of the absorber 6 and 7 for mounting a plate thicker than plate 8, by placing a metallic washer of a suitable thickness between the inner ends 10a and 10b of the fastenings.

FIGS. 5 and 6, in which elements playing the same role as those of FIGS. 1 to 3 are shown by the same reference numerals increased by 100, show a modification in which the projections 105 extend radially between the serrations 104 of the hub 101a and a circular rib 13 the terminal surface 13a of which is in the same transverse plane as the terminal surfaces 105a of these projections. In addition, it would be possible to vary the configuration practically endlessly and also to vary the form, number and position of the projections of the hub and of the flange of the elastomeric rings. For example in FIGS. 7 to 9, where the elements playing the same role as those of FIGS. 1 to 3 are shown by the same reference numerals increased by 200, only four radial projections 205 are provided, while the hub 201a comprises eight serrations 204, and the radial ends 14 of these pieces 205 are rounded.

There is therefore a wide choice of forms and positions of the elastomeric rings available for adapting the absorber to the load which it must support. For certain applications it is even possible to choose halves of absorbers comprising elastomeric rings of different hardnesses or different forms, for example to replace the half-absorber 7 in FIG. 4 by the half-absorber of FIGS. 5 and 6 or by those of FIGS. 7 to 9. It is also possible to superimpose several absorbers.

It goes without saying that the embodiments described are only examples, and that they could be modified, notably by substituting equivalent techniques, without departing from the scope of the invention. In particular, the serrated hub such as 1a of one of the halves of the absorber could completely cross the middle plate such as 8, the other half comprising only an elastomeric flange such as 2b, 5. Instead of being formed on the fastenings, the elastomeric rings could be made separately and fixed to the fastenings by vulcanising.

I claim:

1. A vibration absorber for connecting a vibratory element to a non-vibrating element, comprising:
   two resilient members each comprising a ring of elastomeric material having a smooth bore, a smooth annular outer end surface, and an annular inner end surface formed with a plurality of radially extending ribs having extreme edge level surfaces situated in a plane perpendicular to said bore, and a rigid fastening having an end flange bonded to said annular outer end surface, and a tubular portion bonded to said bore and having an inner end which projects beyond said ring of elastomeric material;
   at least one of said rings comprising a hub which extends beyond said plane and has an outer peripheral surface formed with a plurality of serrations projecting thereon;
   a plate shaped portion of one of said elements, having an opening formed therethrough, of a diameter substantially equal to the overall outer diameter of said serrated hub; and
   brace means extending through said tubular portion of each said member for pulling said fastening of each said member together whereby to draw said inner end of each said tubular portion toward each other across said opening with said serrations engaging the same, and to cause said ribs of each said member to engage both sides of said plate shaped portion, and for connecting said fastening of each said member to the other one of said elements.

2. An absorber according to claim 1, in which the plate shaped portion has a thickness substantially equal to the spacing of the ribs of the respective elastomeric rings in unrestrained state with the inner end of the rigid tubular portion of each said fastening abutting against each other.

3. An absorber according to claim 1, in which the plate shaped portion has a thickness substantially greater than the spacing of the ribs of the respective elastomeric rings in unrestrained state with the inner end of the rigid tubular portion of each said fastening abutting against each other, and a rigid washer being inserted between each said inner end.

4. An absorber according to claim 1, in which the elastomeric material of one of said rings has a hardness different from the hardness of the elastomeric material of the other one of said rings.

* * * * *

UNITED STATES PATENT OFFICE
CERTIFICATE OF CORRECTION

Patent No. 4,033,533     Dated July 5, 1977

Inventor(s) Berard H. G. Evrard

It is certified that error appears in the above-identified patent and that said Letters Patent are hereby corrected as shown below:

On the Title page, Item [30] should read:

-- France          75 01207          January 9, 1975 --

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*